United States Patent
Ros Blanco

(10) Patent No.: US 9,777,759 B2
(45) Date of Patent: Oct. 3, 2017

(54) CAGED NUT

(71) Applicant: ILLINOIS TOOL WORKS INC., Glenview, IL (US)

(72) Inventor: Xavier Ros Blanco, Braunschweig (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 110 days.

(21) Appl. No.: 14/415,152

(22) PCT Filed: Jul. 24, 2013

(86) PCT No.: PCT/US2013/051845
§ 371 (c)(1),
(2) Date: Jan. 16, 2015

(87) PCT Pub. No.: WO2014/018646
PCT Pub. Date: Jan. 30, 2014

(65) Prior Publication Data
US 2015/0176630 A1    Jun. 25, 2015

(30) Foreign Application Priority Data
Jul. 24, 2012 (ES) .................................. 201200757

(51) Int. Cl.
*F16B 39/28* (2006.01)
*F16B 37/04* (2006.01)

(52) U.S. Cl.
CPC .................. *F16B 37/044* (2013.01)

(58) Field of Classification Search
CPC ....................................................... F16B 37/04
USPC ................................. 411/112, 113, 522–524
See application file for complete search history.

(56) References Cited

U.S. PATENT DOCUMENTS

| | | | | |
|---|---|---|---|---|
| 1,768,505 A | * | 6/1930 | Carr ....................... | F16B 37/043 24/694 |
| 2,724,419 A | * | 11/1955 | Poupitch ............... | F16B 37/044 411/113 |
| 2,727,552 A | * | 12/1955 | Chvesta ................ | F16B 37/044 411/112 |
| 2,746,111 A | * | 5/1956 | Chvosta ................. | F16B 5/125 24/293 |
| 2,779,377 A | * | 1/1957 | Flora ..................... | F16B 37/044 411/15 |
| 2,867,258 A | * | 1/1959 | Flora ..................... | F16B 37/044 178/17 R |

(Continued)

FOREIGN PATENT DOCUMENTS

| | | |
|---|---|---|
| DE | 1222321 B | 8/1966 |
| EP | 2423079 A1 | 2/2012 |

OTHER PUBLICATIONS

ISR and WO for PCT/US2013/051845 mailed Oct. 24, 2013.

*Primary Examiner* — Gary Estremsky
(74) *Attorney, Agent, or Firm* — Hauptman Ham, LLP

(57) ABSTRACT

A CAGED NUT, of the type formed by the composition of a container housing and a nut accommodated therein, wherein said nut is formed by a planar base from which emerges a threaded cylinder linked to said base by means of a connection vault; said housing or cage being formed by a stamped clip that clasps said nut between flexed lateral arms and folds at the ends of said clip; tabs for engaging with the panel where said assembly is to be fastened emerging from said end folds.

23 Claims, 1 Drawing Sheet

(56) References Cited

U.S. PATENT DOCUMENTS

| | | | | |
|---|---|---|---|---|
| 2,875,804 A | * | 3/1959 | Flora | F16B 37/044 |
| | | | | 411/427 |
| 3,025,897 A | * | 3/1962 | Gieleghem | F16B 37/044 |
| | | | | 411/113 |
| 3,035,624 A | * | 5/1962 | Jaworski | F16B 37/044 |
| | | | | 411/112 |
| 3,189,076 A | | 6/1965 | Adams | |
| 3,192,823 A | * | 7/1965 | Munse | F16B 37/044 |
| | | | | 24/625 |
| 3,217,585 A | * | 11/1965 | Munse | F16B 37/044 |
| | | | | 411/432 |
| 3,314,465 A | | 4/1967 | Bien | |
| 4,606,688 A | * | 8/1986 | Moran | B60Q 1/0433 |
| | | | | 411/175 |
| 4,875,816 A | * | 10/1989 | Peterson | F16B 37/043 |
| | | | | 411/104 |
| 5,893,694 A | * | 4/1999 | Wilusz | F16B 37/044 |
| | | | | 411/112 |
| 6,457,924 B1 | * | 10/2002 | Wallace | F16B 37/02 |
| | | | | 174/58 |
| 6,595,732 B2 | | 7/2003 | Werner et al. | |

\* cited by examiner

CAGED NUT

RELATED APPLICATIONS

The present application is a National Phase of International Application Number PCT/US2013/051845 filed Jul. 24, 2013, which claims priority to Spanish Application Number P 201200757 filed Jul. 24, 2012.

FIELD OF THE INVENTION

The present invention relates to a nut assembly and retention cage therefor configured in order to optimize the performance thereof and to obtain a significant reduction in the material used to make same.

PRIOR ART

There are many situations in which an industry requires preinstallation of a nut in an orifice in a panel, a bodywork, a surface, etc., with a view to mechanizing subsequent mounting of other additional components or accessories.

The present invention relates to a type of such nuts allowing slight clearance therein in terms of the anchoring thereof, with a view to allowing final adjustment thereof, while at the same time being of the type of nut that has to withstand high tightening forces when in the final use position.

One of such type of nuts is that represented by U.S. Pat. No. 6,595,732, in which a female part or nut of non-circular cross section is incorporated into an open retainer housing with skirts or closure tabs, one thereof having an adjustment screw that secures the nut, which is square and raised; said assembly suitable for receiving a fastening screw in said nut. The nut has a broad width in order to accommodate the forces it has to withstand.

In industry, in the case of this type of nut, there are known variations that incorporate tabs for engagement on a panel such that the housing is not free but secured to the panel, fastening the nut thereto.

Said aforementioned nuts are relatively heavy and incorporate a fair amount of material in their formation. However, current technology allows the production of much lighter nuts with performance levels that are even higher than is the norm in terms of the work they are to perform.

European patent EP2423079, from the same applicant, relates to different anchoring-plate assemblies that incorporate lightweight vaulted nuts offering high performance levels that can be placed on panels and surfaces, providing an excellent result in terms of their performance.

However, a problem arises when this type of nut, with anchorings envisaged for welding, is to be used with panels that are thick, for example, and/or in situations where the large raised square knots of the prior art were used. Their relative slenderness and the absence of material in terms of height prevent their being used as a substitute.

It is therefore the principal object of the present invention to provide a caged nut which, made from lightweight, strong materials, can be used with thick panels and as substitutes for the former raised square nuts, which results in a significant weight reduction.

This and other objects of the present invention will become more apparent in the course of the following description.

BRIEF EXPLANATION OF THE INVENTION

The present invention relates to a caged nut, of the type formed by the composition of a container housing and a nut accommodated therein, wherein development of the housing has been optimized with a view to accommodating a nut of vaulted type and allowing the use thereof in thick panels.

The nut is formed by a planar base from which emerges a nut in the form of a threaded cylinder linked to said base by means of a connection vault.

The housing or cage of said nut is formed by a stamped clip that clasps said nut between flexed lateral arms and folds at the end of said clip from which emerge tabs for engaging with the panel where it is to be fastened.

The objectives envisaged by the invention have thus been achieved. For example, the nut thus created offers high levels of performance in terms of the working tightening forces thereof and affords a significant reduction in terms of material and weight for the component as a whole. The configuration thereof allows the engagement of the nut in the assembly and prevents the nut from being lost once it has been installed where it is to be used.

The nut of the invention can be used in thick panels and as a substitute for known caged nuts of much greater thickness and weight.

BRIEF EXPLANATION OF THE DRAWINGS

For a better understanding of the invention, the present description is accompanied by a sheet of drawings provided solely by way of non-limiting illustrative example.

DETAILED EXPLANATION OF THE INVENTION

Figure 1:
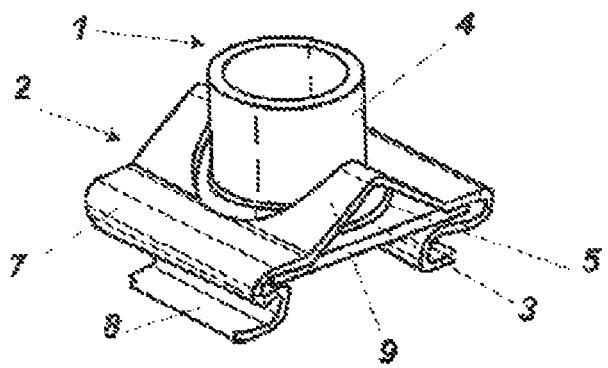
FIG. 1 shows a perspective representation of a preferred embodiment of the caged nut of the present invention in plan view.
Figure 2:
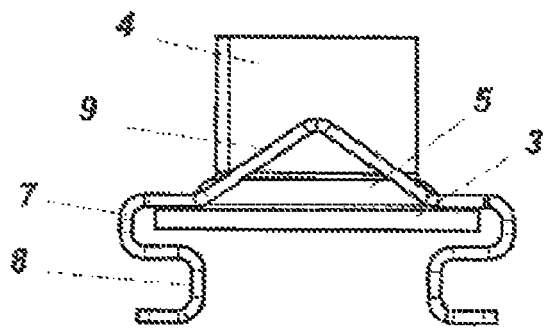
FIG. 2 shows an elevation of the caged nut of the preceding figure.

The present invention comprises a caged nut of the type produced by the composition of a container housing (2) and a nut (1) accommodated therein, wherein said nut (1) is formed by a planar base (3) from which emerges a nut in the form of a threaded cylinder (4) linked to said base by means of a connection vault (5).

The nut (1) may be produced from any appropriate material suitable for providing a higher capacity for work and which is lightweight. This is the case, for example, of boron steel or heat-treated C45 or C67 steel. In fact, the invention also envisages the possibility of the cage (2) or the nut (1) potentially being made from different materials.

Figure 3:
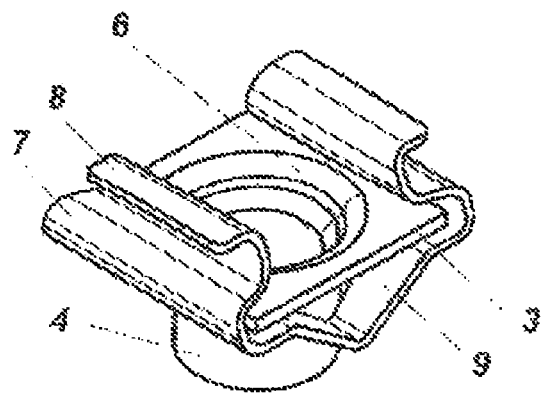
FIG. 3 shows a perspective representation of the caged nut of the preceding figures, from underneath.

As may be seen from FIG. 3, the nut (1), seen from below, incorporates a vaulted opening (6) that facilitates the positioning of the fastening screw (not shown) to be used with the application.

In addition to a vaulted opening (6), said connection vault (5) confers on the nut an elastic reserve capacity when the fastening screw is tightened onto the threaded cylinder (4), which can withstand a high tightening torque.

The housing or cage (2) of said nut is formed by a stamped clip that clasps said nut (1) between flexed lateral arms (9) and folds (7) at the end of said clip. Tabs (8) for engaging with the panel where said assembly is to be fastened emerge from said end folds (7).

As shown in the drawings, the planar base (3) engages between the curves of the returns (7) of the cage (1). These returns or folds (7) are located on opposite sides of said planar base (3) and are the starting point for said tabs (8).

The tabs (8) in the preferred embodiment comprise a further fold (8) in the opposite direction from that of the returns (7), configured for engagement in the opening in the panel to be used.

The component as a whole has, in said tabs (8), a degree of flexibility such that, at the time of installation of the component, one of the tabs can be engaged in the panel, allowing flexing of the other tab (8) so that it can be inserted into the opening and likewise engaged in the lateral part of the opening in the panel.

In the preferred embodiment shown in the figures, not only the end fold (7) but also the flexible tabs (8) occupy the entire extent of the side of said clip (2).

The nut (1) is engaged laterally, furthermore, by flexed arms (9) that lend height to the housing (2), center the nut vertically and protect it against unsuitable lateral manipulation. Said arms confer on the clip (2) and the assembly of the caged nut of the present invention an additional elastic reserve capacity when it is applied on the installation panel, making it possible for the component potentially to be suitable for a wide range of panel thicknesses.

In terms of the relationship of one with the other, it is possible to construct the component as a whole so that there is a relative clearance between nut (1) and cage (2), in both orthogonal and/or vertical directions, with a view to it being possible for it to be adapted to applications requiring a final adjustment, at the installation site, when the fastening screw is received. Without becoming over-specialised, it is also possible for the component to be produced with practically no clearance, simply by adjusting the flexed arms (9) and the end folds (7) in order that they tightly engage not only the base (3) of the nut but also the threaded cylinder (4).

The invention can therefore be presented in various embodiments that do not modify the essential features thereof. It is understood that in the present case details of finish or form may be changed provided these do not modify the essential nature of the invention.

The invention claimed is:

1. A caged nut, of the type formed by the composition of a container housing and a nut accommodated therein, wherein the caged nut comprises said nut formed by a planar base from which emerges a threaded cylinder linked to said base by means of a connection vault; said housing or cage being formed by a stamped clip that clasps said nut between flexed lateral arms and folds at the ends of said clip; tabs for engaging with a panel where said assembly is to be fastened emerging from said end folds, wherein the nut includes a female threaded section, and the housing is symmetrical about the longitudinal extension of the female threaded section, and the housing, with respect to location from a bottom of the caged nut to a top of the cage nut, is such that:

all below the nut, the housing extends inward in a direction normal to the longitudinal extension of the female threaded section, then extends upward in a direction parallel to the longitudinal extension of the female threaded section, then extends outward in a direction normal to the longitudinal extension of the female threaded section; and all at a level of the nut, the housing extends upward in a direction parallel to the longitudinal extension of the female threaded section, then inward in a direction normal to the longitudinal extension of the female threaded section, and then upward at an oblique angle to the normal direction and to the parallel direction of the longitudinal extension of the female threaded section.

2. The caged nut as claimed in claim 1, wherein said nut is made from heat-treated C45 or C67 boron steel.

3. The caged nut as claimed in claim 1, wherein the housing is symmetrical about the longitudinal extension of the female threaded section.

4. A caged nut of the type formed by the composition of a container housing and a nut accommodated therein, wherein:

said nut is formed by a planar base from which emerges a threaded cylinder linked to said base by a connection that extends at an angle from the plate upward and inward towards the threaded cylinder from an opening in the plate;

the housing is formed by a stamped clip that clasps said nut between flexed lateral arms and folds at the ends of said clip; and the caged nut includes tabs for engaging with a panel where said assembly is to be fastened emerging from said end folds; and the flexed lateral arms, at their highest point above the plate, are above the highest point of the connection vault, and the flexed lateral arms are between the folds.

5. The caged nut of claim 4, wherein:
the tabs extend outwardly from the caged nut in a plane normal to a longitudinal axis of the caged nut.

6. The caged nut of claim 4, wherein:
the tabs extend outwardly from the caged nut in a plane normal to a longitudinal axis of the caged nut, wherein the respective tabs extend from respective bends in the tabs to respective tips of the tabs to establish the outward extension from the caged nut.

7. The caged nut of claim 4, wherein:
the tabs establish respective flat surfaces at the bottom-most portion of the caged nut.

8. The caged nut of claim 4, wherein:
the tabs establish respective flat surfaces at the bottom-most portion of the caged nut, the respective flat surfaces being parallel to one another and on the same plane.

9. The caged nut of claim 4, wherein:
the highest portions of the housing relative to a top of the cylinder are located at a middle of the caged nut.

10. The caged nut of claim 4, wherein:
the housing extends upwards to provide clearance for outer portions of the connection that extends at an angle from the plate.

11. The caged nut of claim 4, wherein:
tips of the housing extends in a lateral direction beyond the greatest extension of the plate in the lateral direction.

12. The caged nut of claim 4, wherein:
the plate has a rectangular shape when viewed along the longitudinal axis of the cylinder.

13. The caged nut of claim 4, wherein:
the housing contacts less than half of a total surface area of the plate on the side of the plate facing the cylinder.

14. The caged nut of claim 4, wherein:
the cylinder extends a substantial distance above a highest point of the housing.

15. A caged nut, of the type formed by the composition of a container housing and a nut accommodated therein, wherein the caged nut comprises said nut formed by a planar base from which emerges a threaded cylinder linked to said base by means of a connection vault; said housing or cage being formed by a stamped clip that clasps said nut between flexed lateral arms and folds at the ends of said clip; tabs for engaging with a panel where said assembly is to be fastened emerging from said end folds, wherein the nut includes a female threaded section, and at least one of:

the flexed arms protrude upwards away from the plate in a same direction as the threaded section extends away from the plate; or the housing is symmetrical about the longitudinal extension of the female threaded section.

16. The caged nut as claimed in claim 15, wherein in a lower part of said nut has a vaulted opening.

17. The caged nut as claimed in claim 15, wherein said tabs have a fold in the opposite direction from that of returns, designed in order to engage in the orifice in the panel with which the component is to be used.

18. The caged nut as claimed in claim 15, wherein not only the end folds but also the tabs occupy the entire extent of the side of said cage.

19. The caged nut as claimed in claim 15, wherein said planar base of said nut is engaged with variable, slight or tight, clearance between the curves of returns of the cage and said flexed arms, and also in the vertical direction, allowing play in three directions.

20. The caged nut as claimed in claim 15, wherein the tabs are flexible.

21. The caged nut as claimed in claim 15, wherein the flexed lateral arms, at their highest point above the plate, are above the highest point of the connection vault, and the flexed lateral arms are between the folds.

22. The caged nut as claimed in claim 15, wherein the flexed arms are directly adjacent the outer surface of the wall that forms the threaded section, the outer surface opposite the threads.

23. The caged nut as claimed in claim 15, wherein the flexed arms protrude upwards away from the plate in the same direction as the threaded section extends away from the plate.

\* \* \* \* \*